US009786291B2

(12) United States Patent
Narayan et al.

(10) Patent No.: US 9,786,291 B2
(45) Date of Patent: Oct. 10, 2017

(54) COMMUNICATING INFORMATION BETWEEN DEVICES USING ULTRA HIGH FREQUENCY AUDIO

(71) Applicant: Google Technology Holdings LLC, Mountain View, CA (US)

(72) Inventors: Shyam Narayan, Santa Clara, CA (US); Naveen Aerrabotu, Gurnee, IL (US); Sreenivasulu Rayanki, Grayslake, IL (US); Yun-Ming Wang, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 197 days.

(21) Appl. No.: 14/307,559

(22) Filed: Jun. 18, 2014

(65) Prior Publication Data
US 2015/0371650 A1 Dec. 24, 2015

(51) Int. Cl.
*G10L 19/00* (2013.01)
*G10L 19/025* (2013.01)
*H04B 11/00* (2006.01)

(52) U.S. Cl.
CPC ............ *G10L 19/025* (2013.01); *H04B 11/00* (2013.01)

(58) Field of Classification Search
USPC .................................................. 704/500–504
See application file for complete search history.

(56) References Cited

U.S. PATENT DOCUMENTS

| 2001/0047256 A1* | 11/2001 | Tsurushima ..... G11B 20/00007 704/200 |
| 2003/0142746 A1* | 7/2003 | Tanaka .................. H04N 19/61 375/240.11 |
| 2007/0104279 A1* | 5/2007 | Taniguchi ......... H04L 25/03834 375/259 |

(Continued)

FOREIGN PATENT DOCUMENTS

| WO | 2010138777 A1 | 12/2010 |
| WO | 2011137375 A2 | 11/2011 |

OTHER PUBLICATIONS

European Patent Office, International Search Report and Written Opinion for PCT Application No. PCT/US2015/036241 (related to above-captioned patent application), dated Sep. 24, 2015.

(Continued)

*Primary Examiner* — Leonard Saint Cyr
(74) *Attorney, Agent, or Firm* — Faegre Baker Daniels LLP (57) ABSTRACT

A client device encodes data into an audio signal and communicates the audio data to an additional client device, which decodes the data from the audio signal. The data is partitioned into characters, which are subsequently partitioned into a plurality of sub-characters. Each sub-character is encoded into a frequency, and multiple frequencies that encode sub-characters are combined by the client device to generate an audio signal. Frequencies encoding sub-characters may be above 16 kilohertz, so the sub-characters are transmitted using frequencies that are inaudible to humans. The audio signal is communicated to an additional client device, which decodes frequencies from the audio signal to sub-characters, which are then combined into characters by the additional client device to generate the data.

23 Claims, 3 Drawing Sheets

(56) References Cited

U.S. PATENT DOCUMENTS

| | | | | |
|---|---|---|---|---|
| 2009/0262864 A1* | 10/2009 | Liu | ............... | H04L 25/03171 |
| | | | | 375/322 |
| 2010/0056081 A1* | 3/2010 | Taniguchi | ............... | H04L 27/12 |
| | | | | 455/110 |
| 2010/0274555 A1* | 10/2010 | Laaksonen | ............ | G10L 21/038 |
| | | | | 704/201 |
| 2010/0280834 A1* | 11/2010 | Tsushima | ............ | G10L 19/0208 |
| | | | | 704/500 |
| 2010/0332221 A1* | 12/2010 | Yamanashi | ............ | G10L 21/038 |
| | | | | 704/207 |
| 2011/0280260 A1* | 11/2011 | Oh | ............... | H04N 21/4382 |
| | | | | 370/474 |
| 2014/0189724 A1* | 7/2014 | Harkness | ............... | H04H 20/31 |
| | | | | 725/18 |
| 2014/0222438 A1* | 8/2014 | Courtney, III | ...... | H04L 67/2823 |
| | | | | 704/500 |

OTHER PUBLICATIONS

Proximity pairing of smartphones with ultra-high frequency sound waves, http://circlewithme.tumblr.com/post/25893923940/proximity-pairing-sound-waves, Jan. 30, 2014, all pages.

\* cited by examiner

COMMUNICATING INFORMATION BETWEEN DEVICES USING ULTRA HIGH FREQUENCY AUDIO

BACKGROUND

This disclosure generally relates to communicating data between client devices, and more specifically to encoding data for communicating using ultra high frequency audio.

Users increasingly exchange data between various client devices. For example, a user may have a smartphone and a tablet computer and exchange data and exchange data between the smartphone and the tablet computer at times. As another example, a user may replace or upgrade a smartphone and migrate data from a currently-used smartphone to a replacement or new smartphone. Often, different client devices are connected to a network, allowing the user to exchange data between client devices via the network.

However, when exchanging data between client devices, one of the client devices may lack information for establishing a connection to the network. For example, a client device may lack the network's service set identifier (SSID) and the types of available connections to the network. Conventionally, the SSID may be manually provided to the client device or captured via a quick response (QR) code presented by another client device. While this allows the client device to establish a connection to the network, the connection may fail to efficiently use the network's capabilities, often necessitating the client device establish an additional connection to the network after obtaining information about the network via the network connection. Additionally, if no network is available or limited-quality connections to network are available to the client device, data may be inefficiently communicated from the client device to another client device.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A client device encodes data into an audio signal and communicates the audio data to an additional client device, which decodes the data from the audio signal. This simplifies exchange of data between the client device and the additional client device if the client device or the additional client device is not connected to a network or allows data to be exchanged between the client device and the additional client device without using a network. In one embodiment, the client device partitions the data into characters and subsequently partitions each character into a plurality of sub-characters. Each sub-character is encoded into a frequency, and frequencies encoding multiple sub-characters are combined by the client device to generate an audio signal. In one embodiment, the frequencies encoding the sub-characters are above 16 kilohertz, so the sub-characters are transmitted using frequencies that are inaudible to humans. For example, a base frequency equaling or exceeding 16 kilohertz is identified, and the base frequency is incremented by an amount based at least in part on a value of a sub-character to encode the sub-character into a frequency. The client device communicates the audio signal to an additional client device to communicate the data.

When the additional client device captures the audio signal, the additional client device decodes frequencies in the audio signal to identify various sub-characters. For example, the additional client device generates a frequency domain representation of the audio signal and identifies different frequency blocks that each include a range of frequencies. In each frequency block, a frequency having a maximum magnitude is identified and converted into a value of a sub-character using the base frequency, information describing the frequency blocks, and a frequency difference between different values of the sub-characters. Multiple sub-characters are combined into characters by the additional client device to generate the data from the audio signal. For example, sub-characters identified from adjacent frequency blocks, such as a pair of adjacent frequency blocks, are combined to generate a character, and multiple characters are generated to produce the data from the audio signal.

System Architecture

Figure 1:
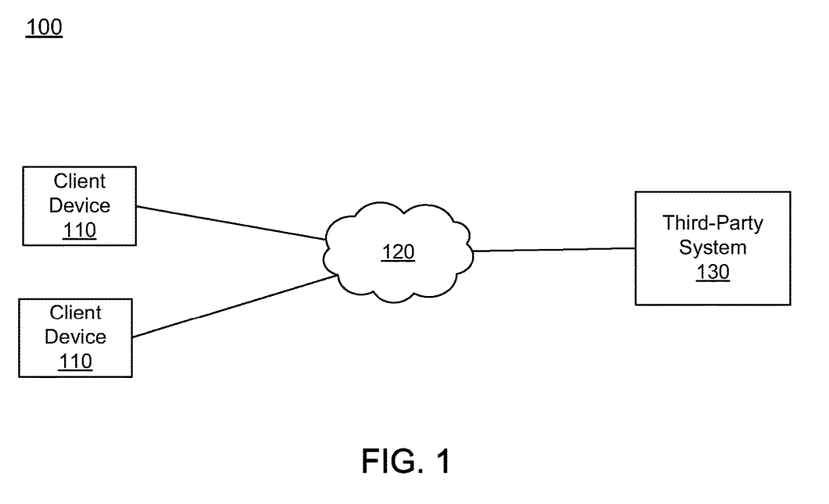
FIG. 1 is a block diagram of a system environment, in accordance with an embodiment.

FIG. 1 is a block diagram of a system environment 100 including multiple client devices 110A, 110B (also referred to individually and collectively using reference number 130), a network 120, and a third-party system 130. In various embodiments, any number of client devices 110 or third-party systems 130 may be included in the system environment 100. Additionally, in alternative configurations, different and/or additional components may be included in the system environment 100. In some embodiments, the system environment 110 may include fewer components than those shown in FIG. 1; for example, the system environment 110 includes client devices 110A, 110B and the network 120.

A client device 110 is one or more computing devices capable of receiving user input as well as transmitting and/or receiving data via the network 120. In one embodiment, the client device 110 is a computer system, such as a desktop or a laptop computer. Alternatively, the client device 110 is any device with computing functionality, such as a personal digital assistant (PDA), a mobile telephone, a smartphone, a tablet computer or another suitable device. A client device 110 may include instructions for executing one or more applications that modify data or exchange data with a third-party system 130. For example, the client device 110 executes a browser that receives content from a third-party system 130 and presents the content to a user of the client device 110. In another embodiment, the client device 110 interacts with a third-party system 130 through an application programming interface (API) running on a native operating system of the client device 110, such as IOS® or ANDROID™. One embodiment of a client device 110 is further described below in conjunction with FIG. 2.

One or more client devices 110A, 110B and the third-party system 130 communicate with each other via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

A third party system 130 may be coupled to the network 120 for communicating with a client device 110. In one embodiment, a third party system 130 is an application provider communicating information describing applications for execution by a client device 110 or communicating data to the client device 110 for use by an application executing on the client device 110. In other embodiments, a third party system 130 provides content or other information for presentation via a client device 110. Examples of content provided by a third party system 130 include text, images, video, or audio on web pages, web feeds, social networking information, messages, or other suitable data. Additional examples of content include user-generated content such as blogs, tweets, shared images, video or audio, social networking posts, and social networking status updates. Content provided by a third party system 130 may be received from a publisher and distributed by the third party system 130, or a third party system 130 may generate and distribute content itself. For convenience, content from a third party system 130, regardless of its composition, may be referred to herein as a "content item" or as "content." Content provided by a third party system 130 may include multiple types of data, such as text data, image data, video data, or audio data.

Figure 2:
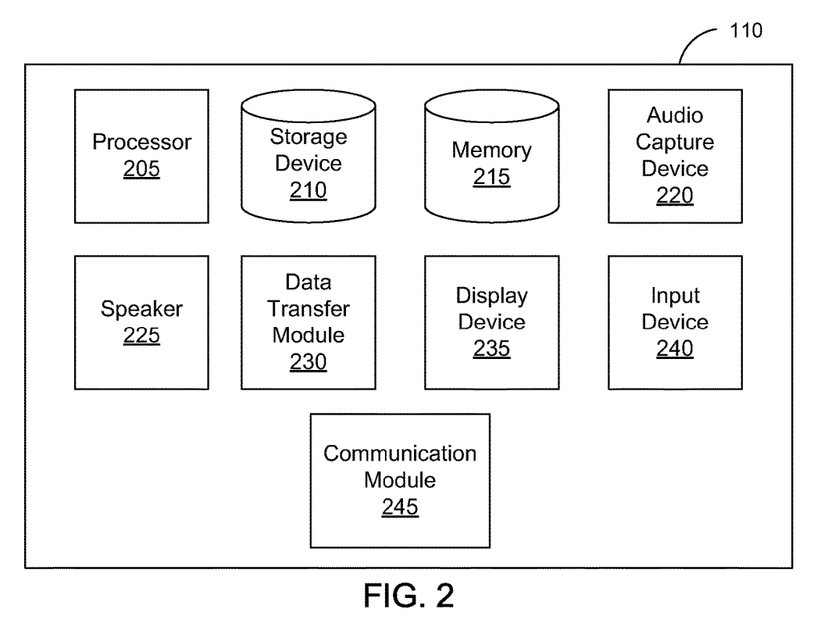
FIG. 2 is a block diagram of a client device, in accordance with an embodiment.

FIG. 2 is a block diagram of one embodiment of a client device 110. In the example shown by FIG. 2, the client device 110 includes a processor 205, a storage device 210, a memory 215, an audio capture device 220, a speaker 225, a data transfer module 230, a display device 235, an input device 240, and a communication module 245. However, in other embodiments, the client device 110 may include different and/or additional components than those described in conjunction with FIG. 2.

The client device 110 includes one or more processors 205, which retrieve and execute instructions from the storage device 210 or the memory 215. Additionally, a processor 205 receives information from the input device 240 and executes one or more instructions included in the received information. The storage device 210 is a persistent storage device including data and/or instructions for execution by the processor 205 or for presentation to a user of the client device. Examples of a storage device 210 include a solid-state drive, a flash memory drive, a hard disk drive, or other suitable persistent storage device.

The memory 215 stores instructions for execution by the one or more processors 205. In various embodiments, the memory 215 is a volatile storage medium, while the storage device 210 is a non-volatile storage medium. Examples of a volatile storage medium include random access memory (RAM), static random access memory (SRAM), and dynamic random access memory (DRAM). Storing data or instructions in the memory 215 allows a processor 205 to retrieve the data or instructions more rapidly than data or instructions stored in the storage device 210. Data or instructions included in the memory 215 may be modified at various time intervals or in response to data received from a processor 205.

In one embodiment, the memory 215 is partitioned into a plurality of regions that are each associated with an identifier. For example, the memory 215 includes multiple slots that each represent a specified amount of the memory 215 and are each associated with an address, allowing data stored in a slot to be retrieved using an address associated with a slot. Hence, different data may be stored in different slots and subsequently retrieved based on the identifiers associated with the slots.

An audio capture device 220 captures audio data and generates data representing the captured audio data. For example, the audio capture device 220 generates an electrical signal from identified air pressure variations, and communicates the generated electrical signal to the processor 205, the storage device 210, or to any other suitable component of the client device 110. In various embodiments one or more microphones comprise the audio capture device 220.

The speaker 225 receives an electrical signal and generates one or more sound waves based on the electrical signal to produce an audio signal. For example, the speaker 225 receives an electrical signal from the processor 205 or the data transfer module 230 and generates an audio signal from the electrical signal. While FIG. 2 shows an example client device 110 with a single speaker 225, in other embodiments, the client device 110 may include multiple speakers 225.

The data transfer module 230 encodes data and communicates the encoded data to the speaker 225, which generates an audio signal from the encoded data. In one embodiment, the data transfer module obtains data from the input device 240 or from the storage device 210 and partitions the data into multiple characters. Each character is partitioned into a plurality of sub-characters, and the data transfer module 230 encodes each sub-character into frequencies, which are combined to generate an audio signal including the obtained data. In various embodiments, the data transfer module 230 identifies a base frequency, a frequency block size, a frequency difference between frequency blocks, and a frequency difference between values associated with sub-characters, and encodes a value of a sub-character from obtained data in a frequency block. For example, the data transfer module 230 associates a block number with each frequency block and generates a block frequency value as a product of a block number of a frequency block and a sum of the frequency block size and the frequency difference between frequency blocks; additionally, a value associated with a sub-character is determined and multiplied by the frequency difference between sub-character values to determine a sub-character frequency value. The data transfer module 230 generates a frequency encoding the sub-character by incrementing the base frequency by the block frequency value and the sub-character frequency value. Frequencies generated for multiple sub-characters in the obtained data are combined by the data transfer module 230 to generate an audio signal, allowing the obtained data to be communicated to another client device 110 via the speaker 225. Generating an audio signal encoding data is further described below in conjunction with FIGS. 3 and 4.

Additionally, the data transfer module 230 receives information generated from the audio capture device 220 based on an audio signal and decodes data from the audio signal. This allows the client device 110 simplifies communication of data between client devices 110A, 110B by enabling the data to be communicated via the audio signal. For example, when the audio capture device 220 captures an audio signal including a start frequency, the audio capture device 220 communicates a portion of the audio signal received after the start frequency to the data transfer module 230 until a termination frequency is received by the audio capture device 220. The data transfer module 230 generates a frequency domain representation of the portion of the audio signal from the generated data. For example, the data transfer module 230 applies a time-to-frequency domain transform (e.g., a Fourier transform) to the portion of the audio signal and identifies different frequency blocks from the frequency domain representation of the audio signal. In each frequency block, the data transfer module 230 identifies a frequency associated with a maximum magnitude. The data transfer module 230 converts the frequency associated with the maximum magnitude in each frequency block into a value of a sub-character and combines values of sub-characters in adjacent frequency blocks to generate a character. One or more characters are combined to generate the data represented by the audio signal. Generating data from an audio signal is further described below in conjunction with FIG. 3.

A display device 235 presents content and other information to a user of the client device 110. Examples of the display device 235 include a liquid crystal display (LCD), an organic light emitting diode (OLED) display, an active matrix liquid crystal display (AMLCD), or any other suitable device. Different client devices 110 may have display devices 235 with different sizes, different resolutions, or other different characteristics.

For purposes of illustration, FIG. 2 shows a single input device 240; however, the client device 110 may include multiple input devices 240 in various embodiments. The input device 240 receives input from a user of the client device 110. Examples of the input device 240 include a touch-sensitive display, a keyboard, a dial pad, a mouse, and a trackpad. Using a touch-sensitive display allows the client device 110 to combine the display device 235 and the input device 240, simplifying user interaction with presented content. Inputs received via the input device 240 are be processed by the processor 205 and may be communicated to a third party system 130 or to another client device 110 via the communication module 245.

The communication module 245 transmits data from the client device 110 to another client device 110 or to a third party system 130 via the network 120. Additionally, the communication module 245 receives data via the network 120 (e.g., data from another client device 110 or from a third party system 130) and communicates the received data to one or more components of the client device 110. For example, the communication module 245 is a wireless transceiver configured to transmit data using one or more wireless communication protocols. Example wireless communication protocols include: Global System of Mobile (GSM), Code Division, Multiple Access (CDMA), General Packet Radio Service (GPRS), third-generation (3G) mobile, fourth-generation mobile (4G), High Speed Download Packet Access (HSDPA), High Speed Uplink Packet Access (HSUPA), Long-Term Evolution (LTE) and Worldwide Interoperability for Microwave Access (WiMAX).

Communicating Data Between Client Devices Via an Audio Signal

Figure 3:
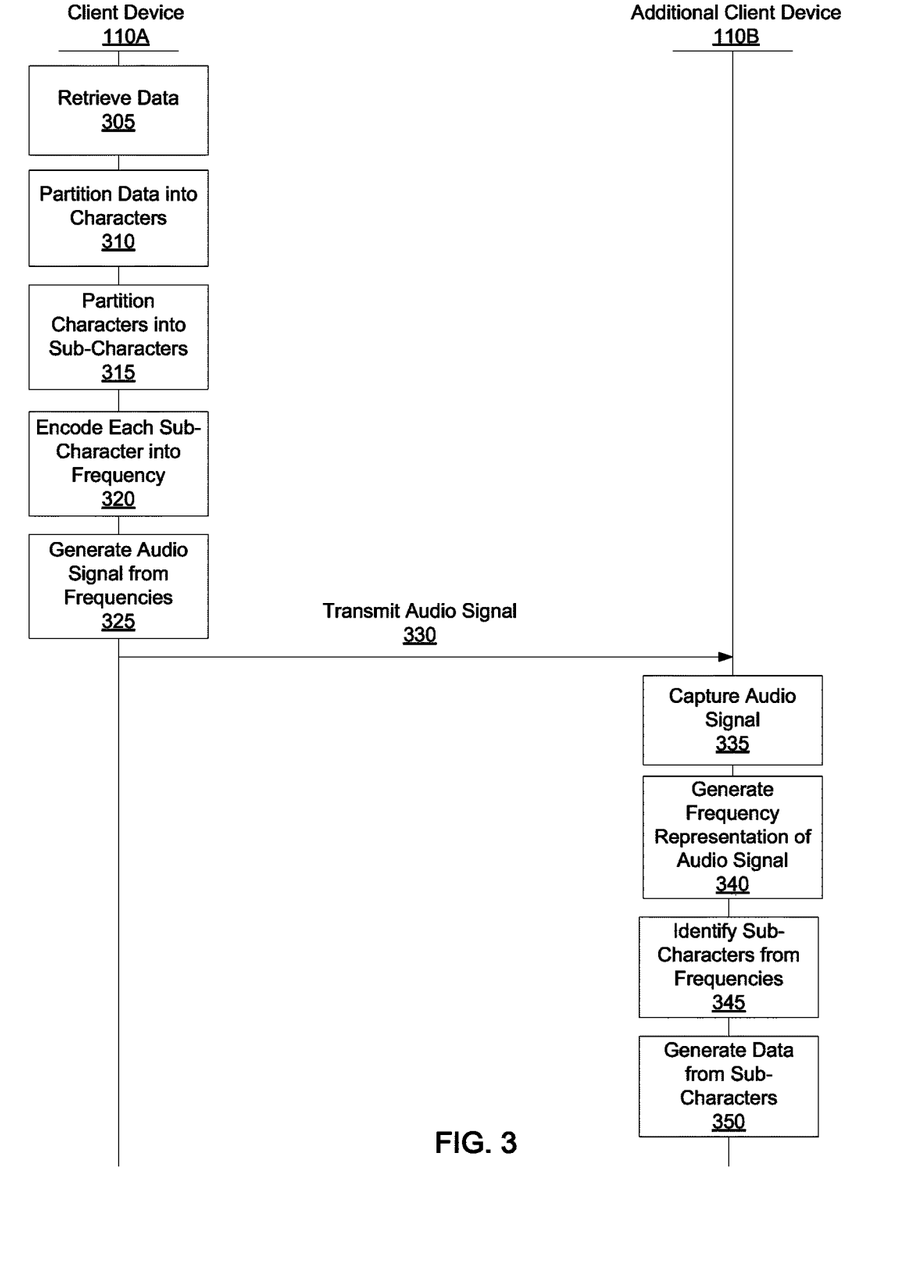
FIG. 3 is an interaction diagram of a method for communicating data between client devices using an audio signal, in accordance with an embodiment.

FIG. 3 is an interaction diagram of a method for communicating data between a client device 110A and an additional client device 110B using an audio signal. In other embodiments, the method includes different or additional steps than those shown in the example described in conjunction with FIG. 3. Additionally, some embodiments may perform steps described in conjunction with FIG. 3 in different orders.

The client device 110A retrieves 305 data for communication to the additional client device 110B. For example, the client device 110A retrieves 305 authentication information for accessing a network 120 from a storage device 210 of the client device 110 or receives the authentication information via an input device 240. For example, the client device 110A retrieves 305 a service set identifier (SSID) of a network 120 to which the client device 110A is coupled. Characteristics of the network 120, such as the network bandwidth or a type of connection between the client device 110A and the network 120 may also be retrieved 305. However, any suitable data may be retrieved 305.

The client device 110A partitions 310 the retrieved data into characters. As used herein, a "character" is a group of data having a specified size. In one embodiment, each character comprises eight bits. For example, if the retrieved data is an alphanumeric string, the client device 110A partitions 310 the alphanumeric string into individual characters that are each represented using eight bits. Each character is further partitioned 315 by the client device 110 into two or more sub-characters. In an embodiment where each character is eight bits, each sub-character may be four bits, so each character is partitioned 315 into two groups of four bits. In this embodiment, each sub-character has a hexadecimal value between 0 and F. As an example, if the retrieved data includes the string "AB," the client device 110 partitions 310 the string into the characters "A" and "B," and identifies the American Standard Code for Information Interchange (ASCII) values for each character. Hence, the character "A," has a binary value of 01000001, which is partitioned 315 into two four-bit sub-characters having binary values of 0100 and 0001. Also in the preceding example, the character "B" has an ASCII value of 01000010, which is partitioned 315 into two sub-characters having binary values of 0100 and 0010.

Based on the values of sub-characters, the client device 110A encodes 320 each sub-character into a frequency. In various embodiments, the client device 110A identifies a base frequency and increments the based frequency based on a value of a sub-character to encode 320 the sub-character into a frequency. For example, the base frequency is between 16 kilohertz and 18 kilohertz, so incrementing the base frequency encodes 320 sub-characters into frequencies that are inaudible to humans. In one embodiment, the client device 110A determines a number of frequency blocks that each include frequencies higher than the base frequency, and encodes 320 a single sub-character per frequency block, so a frequency associated with a maximum magnitude in a frequency block represents a value of the sub-character. For example, the client device 110A identifies a base frequency of 16.850 kilohertz and 16 frequency blocks, each frequency block having a size of 240 Hertz and adjacent frequency blocks separated by a frequency difference of 75 Hertz, in which sub-characters are encoded. Each frequency block is associated with a block number or other suitable index, allowing identification of individual frequency blocks.

In addition to determining frequency blocks, the client device 110A associates different frequencies with different values of sub-characters. For example, the client device 110A determines a frequency difference between values of a sub-character, and determines a frequency for a value of the sub-character based on the value of the sub-character and the frequency difference between values of sub-characters. In one embodiment, to encode 320 a sub-character, the client device 110A identifies a block number of a frequency block to encode 320 the sub-character and determines a block frequency value as a product of the block number and a sum of the size of the frequency block and the frequency difference between frequency blocks. Additionally, the client device 110A determines a sub-character frequency value as a sum of a value of the sub-character and the frequency difference between values of sub-characters. The client device 110A then encodes 320 the sub-character as a frequency that is a sum of the base frequency, the block frequency value, and the sub-character frequency value. For example, the frequency in which a sub-character is encoded 320 is determined as: (base frequency)+(frequency block number)(size of frequency block+frequency difference between frequency blocks)+(frequency difference between sub-character values)(value of sub-character).

Figure 4:
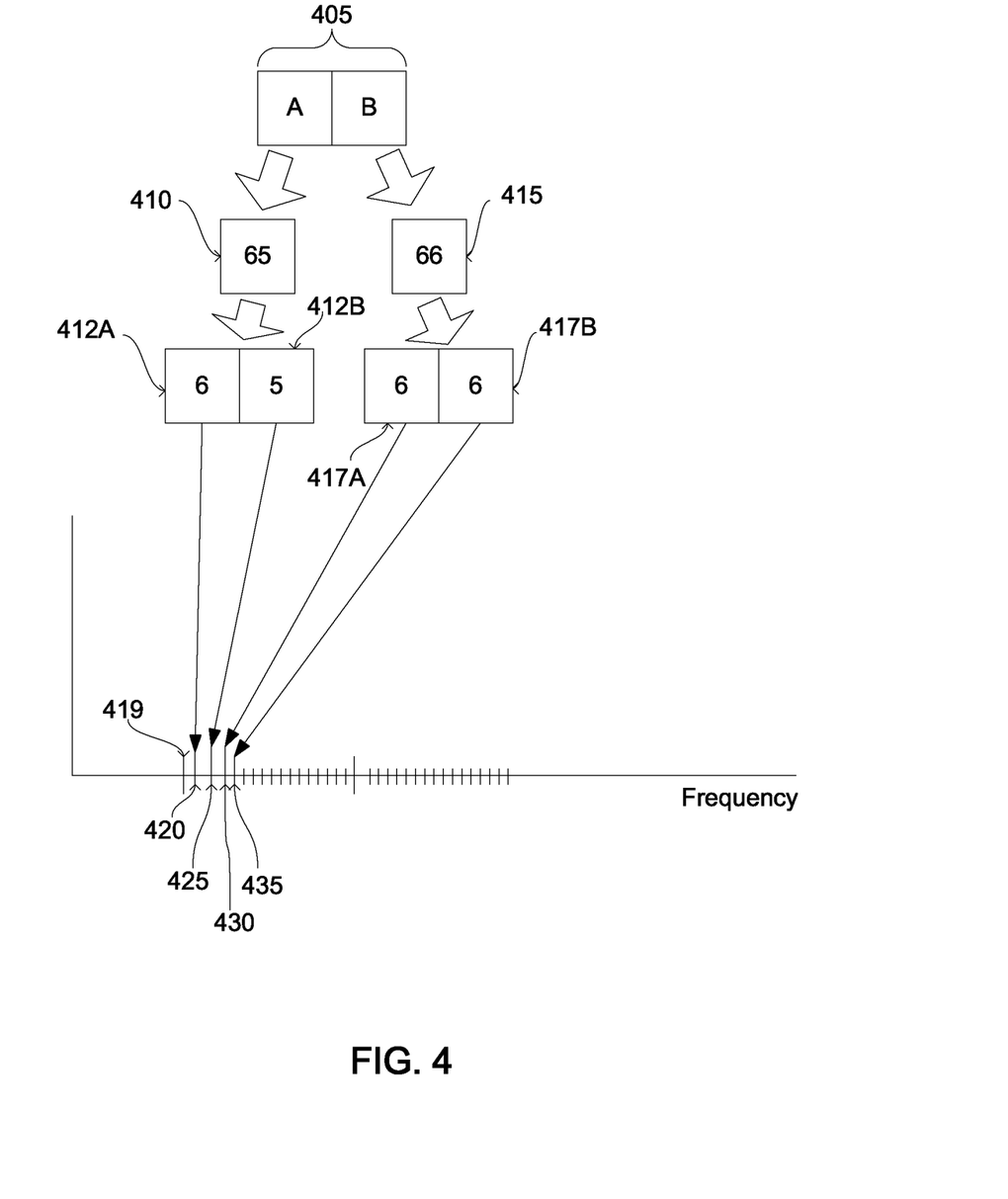
FIG. 4 is an example of encoding data for communication via audio frequencies, in accordance with an embodiment.

FIG. 4 shows an example of encoding 320 sub-characters into frequencies. In the example of FIG. 4, the retrieved data 405 is the alphanumeric string "AB," which is partitioned 310 into character 410, "A," shown in FIG. 4 using its ASCII value of 65, and character 415, "B," also shown in FIG. 4 using its ASCII value of 66. Each character 410, 415 is partitioned 315 into a plurality of sub-characters 412A, 412B, 417A, 417B. In the example of FIG. 4, each character 410, 415 is partitioned 315 into two sub-characters by dividing its eight-bit ASCII value into two four-bit values, shown in FIG. 4 using their hexadecimal values. Hence, character 410 is partitioned 315 into sub-character 412A, having a value of 6, and sub-character 412B, having a value of 5. Similarly, character 415 is partitioned 315 into sub-character 417A, having a value of 6, and sub-character 417B, also having a value of 6.

For purposes of illustration, FIG. 4 describes an example having a base frequency 419 of 16.850 kilohertz and encoding 320 sub-characters using 16 frequency blocks each having a size of 240 Hertz, with adjacent frequency blocks are separated by a frequency difference of 75 Hertz. Each frequency block is associated with a block number ranging from 0 to 15. Additionally, in the example of FIG. 4, each value of a sub-character is separated by a frequency difference of 15 Hertz. To encode 320 sub-character 412A into a frequency block having a block number of 0, the client device 110A determines a block frequency value as a product of the block number and a sum of the size of a frequency block and the frequency difference between frequency blocks; in the example of FIG. 4, the block frequency value for sub-character 412A is (0)[240 Hz+75 Hz], or 0 Hz. The client device 110A also determines a sub-character frequency value for sub-character 412A as a product of the value associated with sub-character 412A and the frequency difference between values of sub-characters, resulting in a sub-character frequency value of (6)(15 Hz), or 90 Hz, for sub-character 412A in the example of FIG. 4. To encode sub-character 412A, the client device 110A increments the base frequency 419 by the block frequency value and by the sub-character frequency value, so sub-character 412A in FIG. 4 is encoded 320 as a frequency 420 of 16,850 Hz+0 Hz+90 Hz, or 16.940 kilohertz.

Similarly, the client device 110A encodes 320 sub-character 412B in a frequency block having a block number of 1 using a block frequency value of (1)[240 Hz+75 Hz] and a sub-character frequency value of (5)(15 Hz), which encodes 320 so sub-character 412B as a frequency 425 of 16,850 Hz+315 Hz+75 Hz, or 17.240 kilohertz. Sub-characters 417A, 417B are similarly encoded 320 into frequency blocks having block numbers of 2 and 3, respectively. Hence, sub-character 417A is encoded 320 as a frequency 430 of 16,850 Hz+[(2)(240 Hz+75 Hz)+(6)(15 Hz)], or 17.570 kilohertz, while sub-character 417B is encoded 320 as a frequency 435 of 16,850 Hz+[(3)(240 Hz+75 Hz)+(6)(15 Hz)], or 17.885 kilohertz. Encoding 320 different sub-characters 412A, 412B, 417A, 417B into different frequencies 420, 425, 430, 435, allows the client device 110A to communicate the sub-characters to another device via an audio signal including the frequencies 420, 425, 430, 435.

Referring back to FIG. 3, when encoding 320 sub-characters into frequencies, the client device 110A identifies a start frequency that is encoded along with the sub-characters to indicate a portion of the audio signal including frequencies that encode 320 sub-characters are encoded and identifies a termination frequency that is also encoded to indicate completion of the portion of the audio signal including frequencies that encode 320 sub-characters. For example, the start frequency is 22 kilohertz and the termination frequency is identified as a frequency encoding a termination value of a sub-character. In one embodiment, a termination frequency is determined as: (base frequency)+(frequency block number)(size of frequency block+frequency difference between frequency blocks)+(frequency difference between sub-character values)(termination value of a sub-character). For example, if sub-characters values range from 0 to 15, a termination value of a sub-character is set to a value of 16, so a frequency block including a frequency encoded using the termination value indicates completion of a portion of an audio signal encoding sub-characters. Referring to the example of FIG. 4, after encoding "AB" in frequency blocks having frequency block numbers 0-4, the retrieved data has been encoded. To indicate that data encoding has been completed, a termination frequency is encoded into a frequency block having frequency block number 5. If a termination value of a sub-character is 16, using the example of FIG. 4, the frequency encoded into the frequency block having frequency block number 5 is 16,850 Hz+[(5)(240 Hz+75 Hz)+(16)(15 Hz)], or 18.665 kilohertz. Thus, in the preceding example when a client device 110 captures a 22 kilohertz frequency in an audio signal, a subsequently captured portion of the audio signal includes sub-characters of data encoded into frequencies, and when the device captures a frequency in the audio signal that results in the termination value of a sub-character when decoded, the portion of the audio signal including encoded sub-characters is completed. Additionally, the client device 110A may include a divider frequency in the audio signal after a specified number of frequency blocks to indicate transmission of the specified number of blocks via the audio signal, allowing a device capturing the audio signal to determine when the specified number of blocks have been received. For example, a divider frequency is included in an audio signal including the encoded frequencies after 16 frequency blocks to separate the audio signal into groups of 16 frequency blocks.

Based on the frequencies from encoding 320 each sub-character, the client device 110A generates 325 an audio signal. In one embodiment, the client device 110A generates a sine wave buffer for each frequency encoding a sub-character value and combines the sine wave buffers into a single sine wave buffer representing the audio signal. For example, the client device 110A adds sine wave buffers for each frequency encoding a sub-character value to generate 325 a sine wave representing the audio signal.

The client device 110A transmits 330 the generated audio signal to the additional client device 110B, which captures 335 the audio signal. For example, the client device 110A transmits 330 the audio signal via one or more speakers 225, and the additional client device 110B captures 335 the audio signal via an audio capture device 220. Hence, the client device 110A may communicate the retrieved data to the additional client device 110B via frequencies of the audio signal encoding sub-characters of the retrieved data.

To extract the data from the audio signal, the additional client device 110B generates 340 a frequency domain representation of the audio signal. For example, the additional client device 110B applies a Fourier transform or other suitable time domain to frequency domain transform to the captured audio signal. In one embodiment, the additional client device 110B applies a fast Fourier transform (FFT) to the captured audio signal to generate 340 the frequency domain representation of the audio signal. In some embodiments, the additional client device 110B generates 340 a frequency domain representation of a portion of the audio signal. For example, the additional client device 110B generates 340 a frequency-domain representation of a portion of the audio signal captured 335 after a start frequency is identified from the audio signal and before a termination frequency is identified from the audio signal, so the generated frequency domain representation corresponds to the portion of the audio signal in which data is encoded.

From the frequency domain representation of the audio signal, the additional client device 110B identifies frequencies that encode sub-characters values and identifies 345 the sub-characters based on the identified frequencies. In an embodiment where the sub-characters are encoded 320 into various frequency blocks, the additional client device 110B stores information identifying a base frequency, a number of frequency blocks, a size of each frequency block, a frequency difference between frequency blocks, and a frequency difference between values of sub-characters. Based on the stored information, the additional client device 110B identifies various frequency blocks. For each frequency block the additional client device 110B determines a frequency in a frequency block that is associated with a maximum magnitude in the frequency block. The additional client device 110B identifies 345 a sub-character from a frequency block by converting the frequency associated with the maximum magnitude in the frequency block to a value of a sub-character.

The additional client device 110B combines identified sub-characters into characters to generate the data from the audio signal. In one embodiment, the additional client device 110B identifies an initial frequency block and combines sub-characters in adjacent pairs of frequency blocks. For example, the additional client device 110B combines sub-characters identified from frequency blocks having block numbers 0 and 1 to generate 350 a character, combines sub-characters identified from frequency blocks having block numbers 2 and 3 to generate 350 an additional character, and further combines sub-characters identified from additional pairs of adjacent frequency blocks to generate 350 additional characters. In some embodiments, the additional client device 110B identifies an initial frequency block from a portion of the audio signal captured 335 a specified length of time after capturing 335 a portion of the audio signal including a starting frequency and combines a sub-character value identified 345 from the initial frequency block with a sub-character value identified 345 from a frequency block received the specified length after capturing 335 the initial frequency block. Sub-character values identified 345 from subsequently received adjacent pairs of frequency blocks are similarly combined to generate characters from the audio signal, and the characters are combined to generate 350 the data. In other embodiments, however, sub-characters from any suitable combination of frequency blocks may be combined to generate 350 the data.

Various actions may be performed by the additional client device 110B based on the generated data. For example, the client device 110A retrieves 305 a SSID and one or more characteristics of a network 120 to which the client device 110A is coupled. As described above, an audio signal is generated 325 based on encoding 320 sub-characters of the data into frequencies. The client device 110A transmits 330 the audio signal to the additional client device 110B, which captures 335 the audio signal and generates 350 the data from sub-characters identified 345 from frequencies in the captured audio signal as described above. This allows the client device 110A to easily communicate the SSID and characteristics of the network 120 to the additional client device 110B, which may establish a connection to the network 120 using the SSID and network characteristics generated 350 from the audio signal. Transmitting the SSID and network characteristics via the audio signal allows the additional client device 110B to more efficiently establish a connection to the network for exchanging information with the client device 110A or with other devices.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

Embodiments include a method comprising: capturing an audio signal at a client device, the audio signal including data encoded into a plurality of frequencies; generating a frequency-domain representation of the audio signal by applying a time domain to frequency domain conversion to the audio signal; identifying a plurality of frequency blocks included in the audio signal; identifying a frequency from each frequency block based on magnitudes associated with frequencies included in each frequency block determined from the frequency-domain representation of the audio signal; generating a sub-character value associated with each of the identified frequencies; and generating the data by combining the generated sub-character values. In embodiments, a frequency identified from a frequency block is associated with a maximum magnitude within the frequency block.

In embodiments, generating the sub-character value associated with each of the identified frequencies comprises: selecting an identified frequency; determining a number associated with a frequency block from which the selected identified frequency was identified; identifying a base frequency, a size of each frequency block, a frequency difference between frequency blocks, and a frequency difference between sub-character values; generating a block frequency value based on the number associated with the frequency block from which the selected identified frequency was identified, the size of each frequency block, and the frequency difference between frequency blocks; generating a modified frequency by subtracting the base frequency the block frequency value from the selected identified frequency; and determining a sub-character value associated with the selected identified frequency based on the modified frequency and the frequency difference between sub-character values. In embodiments, determining the sub-character value associated with the selected identified frequency based on the modified frequency and the frequency difference between sub-character values comprises: dividing the modified frequency by the frequency difference between sub-character values.

In embodiments, generating the data by combining the generated sub-character values comprises: identifying a frequency block and an adjacent frequency block; retrieving a sub-character value associated with a frequency identified from the frequency block; retrieving a sub-character value associated with a frequency identified from the additional frequency block; and generating a character of the data by combining the sub-character value associated with the frequency identified from the frequency block and the sub-character value associated with the frequency identified from the additional frequency block.

In embodiments, the data includes information for establishing a connection to a network. Establishing a connection from the client device to the network is based on the data in embodiments. In embodiments, the frequency from each frequency block is between 16 kilohertz and 22 kilohertz.

Embodiments include a computer program product comprising a computer-readable storage medium having instructions encoded thereon that, when executed by a processor, cause the processor to: capture an audio signal at a client device, the audio signal including data encoded into a plurality of frequencies; generate a frequency-domain representation of the audio signal by applying a time domain to frequency domain conversion to the audio signal; identify a plurality of frequency blocks included in the audio signal; identify a frequency from each frequency block based on magnitudes associated with frequencies included in each frequency block determined from the frequency-domain representation of the audio signal; generate a sub-character value associated with each of the identified frequencies; and generate the data by combining the generated sub-character values. In embodiments, a frequency identified from a frequency block is associated with a maximum magnitude within the frequency block.

In embodiments, generating the sub-character value associated with each of the identified frequencies comprises: select an identified frequency; determine a number associated with a frequency block from which the selected identified frequency was identified; identify a base frequency, a size of each frequency block, a frequency difference between frequency blocks, and a frequency difference between sub-character values; generate a block frequency value based on the number associated with the frequency block from which the selected identified frequency was identified, the size of each frequency block, and the frequency difference between frequency blocks; generate a modified frequency by subtracting the base frequency the block frequency value from the selected identified frequency; and determine a sub-character value associated with the selected identified frequency based on the modified frequency and the frequency difference between sub-character values. In embodiments, determining the sub-character value associated with the selected identified frequency based on the modified frequency and the frequency difference between sub-character values comprises: divide the modified frequency by the frequency difference between sub-character values.

What is claimed is:
1. A method, in a client device, comprising:
retrieving data from the client device;
partitioning the data into one or more characters;
partitioning each character into a plurality of multi-bit sub-characters;
encoding each multi-bit sub-character into a respective sub-character frequency based on a base frequency and a sub-character value frequency, wherein each respective sub-character value frequency is based on a value of each respective multi-bit sub-character, comprising:
identifying the multi-bit sub-character and a value associated with the multi-bit sub-character;

determining a block number of a first frequency block associated with the multi-bit sub-character, the first frequency block including a range of frequencies;
determining a block frequency value based on the block number, a size associated with the first frequency block, and a frequency difference between the first frequency block and a second frequency block;
determining a frequency increment based at least in part on the block frequency value; and
encoding the multi-bit sub-character into the respective sub-character frequency based on the frequency increment;
generating an audio signal from the sub-character frequencies; and
transmitting the audio signal to another client device via a speaker of the client device.

2. The method of claim 1, wherein encoding the multi-bit sub-character into the respective sub-character frequency based on the frequency increment comprises:
determining a sum of the base frequency and the frequency increment.

3. The method of claim 1, wherein generating the audio signal from the sub-character frequencies comprises:
determining a divider frequency;
including the divider frequency in a block to identify a specified number of blocks including a frequency in which the multi-bit sub-character is encoded; and
generating the audio signal based on the frequencies and the divider frequency.

4. The method of claim 1, wherein generating the audio signal from the sub-character frequencies comprises:
determining a termination frequency terminating a portion of the audio signal including the frequencies; and
generating the audio signal by combining the frequencies and the termination frequency.

5. The method of claim 1, wherein generating the audio signal from the sub-character frequencies comprises:
generating a sine wave buffer for each frequency; and
combining the sine wave buffers to generate the audio signal.

6. The method of claim 1, wherein the base frequency is at least 16 kilohertz.

7. The method of claim 1, wherein the base frequency is between 18 kilohertz and 22 kilohertz.

8. The method of claim 1 wherein encoding each multi-bit sub-character into the respective sub-character frequency further comprises:
determining a sub-character frequency value based on the value associated with the multi-bit sub-character and a frequency difference between values associated with the plurality of multi-bit sub-characters; and
determining the frequency increment based at least in part on the block frequency value and the sub-character frequency value.

9. The method of claim 8, wherein determining the frequency increment based at least in part on the block frequency value and the sub-character frequency value comprises:
determining a sum of the block frequency value and the sub-character frequency value.

10. A method, in a client device, comprising:
capturing an audio signal at the client device, the audio signal including data encoded into a plurality of frequencies;
generating a frequency-domain representation of the audio signal by applying a time domain to frequency domain conversion to the audio signal;
identifying a plurality of frequency blocks included in the audio signal;
identifying a frequency from each frequency block of the plurality of frequency blocks based on magnitudes associated with frequencies included in each frequency block determined from the frequency-domain representation of the audio signal;
generating a sub-character value associated with each of the identified frequencies based on identifying a base frequency, a size of each frequency block, a frequency difference between frequency blocks, and a frequency difference between sub-character values, wherein each sub-character value corresponds to a sub-character with multiple bits, comprising:
selecting an identified frequency;
determining a number associated with a frequency block from which the selected identified frequency was identified;
generating a block frequency value based on the number associated with the frequency block from which the selected identified frequency was identified, the size of each frequency block, and the frequency difference between frequency blocks;
generating a modified frequency by subtracting the base frequency and the block frequency value from the selected identified frequency; and
determining a sub-character value associated with the selected identified frequency based on the modified frequency and the frequency difference between sub-character values; and
generating the data by combining the generated sub-character values.

11. The method of claim 10, wherein a frequency identified from a frequency block is associated with a maximum magnitude within the frequency block.

12. The method of claim 10, wherein determining the sub-character value associated with the selected identified frequency based on the modified frequency and the frequency difference between sub-character values comprises:
dividing the modified frequency by the frequency difference between sub-character values.

13. The method of claim 10, wherein generating the data by combining the generated sub-character values comprises:
identifying a frequency block and an adjacent frequency block;
retrieving a sub-character value associated with a frequency identified from the frequency block;
retrieving a sub-character value associated with a frequency identified from the additional frequency block; and
generating a character of the data by combining the sub-character value associated with the frequency identified from the frequency block and the sub-character value associated with the frequency identified from the additional frequency block.

14. The method of claim 10, wherein the data includes information for establishing a connection to a network.

15. The method of claim 14, further comprising:
establishing a connection from the client device to the network based on the data.

16. The method of claim 10, wherein the frequency from each frequency block is between 16 kilohertz and 22 kilohertz.

17. A computer program product comprising a non-transitory computer-readable storage medium having instructions encoded thereon that, when executed by a processor, cause the processor to:

retrieve data from a client device;
partition the data into one or more characters;
partition each character into a plurality of multi-bit sub-characters;
encode each multi-bit sub-character into a respective sub-character frequency based on a base frequency, a frequency of an associated frequency block and a sub-character value frequency, wherein each respective sub-character value frequency is based on a value of each respective multi-bit sub-character, comprising:
  identify the multi-bit sub-character and a value associated with the multi-bit sub-character;
  determine a block number of a first frequency block associated with the multi-bit sub-character, the first frequency block including a range of frequencies;
  determine a block frequency value based on the block number, a size associated with the first frequency block, and a frequency difference between the first frequency block and a second frequency block;
  determine a sub-character frequency value based on the value associated with the multi-bit sub-character and a frequency difference between values associated with the plurality of multi-bit sub-characters;
  determine a frequency increment based at least in part on the block frequency value and the sub-character frequency value; and
  encode the multi-bit sub-character into the respective sub-character frequency based on the base frequency and the frequency increment;
generate an audio signal from the sub-character frequencies; and
transmit the audio signal to another client device via a speaker of the client device.

18. The computer program product of claim 17, wherein determining the frequency increment based at least in part on the block frequency value and the sub-character frequency value comprises:
  determine a sum of the block frequency value and the sub-character frequency value.

19. The computer program product of claim 17, wherein encoding the multi-bit sub-character into the respective sub-character frequency based on the base frequency and the frequency increment comprises:
  determine a sum of the base frequency and the frequency increment.

20. A computer program product comprising a non-transitory computer-readable storage medium having instructions encoded thereon that, when executed by a processor, cause the processor to:
  capture an audio signal at a client device, the audio signal including data encoded into a plurality of frequencies;
  generate a frequency-domain representation of the audio signal by applying a time domain to frequency domain conversion to the audio signal;
  identify a plurality of frequency blocks included in the audio signal;
  identify a frequency from each frequency block based on magnitudes associated with frequencies included in each frequency block determined from the frequency-domain representation of the audio signal;
  generate a sub-character value associated with each of the identified frequencies based on base frequency identity, a size of each frequency block, a frequency difference between frequency blocks, and a frequency difference between sub-character values, wherein each sub-character value corresponds to a sub-character with multiple bits, comprising
    select an identified frequency;
    determine a number associated with a frequency block from which the selected identified frequency was identified;
    generate a block frequency value based on the number associated with the frequency block from which the selected identified frequency was identified, the size of each frequency block, and the frequency difference between frequency blocks;
    generate a modified frequency by subtracting the base frequency the block frequency value from the selected identified frequency; and
    determine a sub-character value associated with the selected identified frequency based on the modified frequency and the frequency difference between sub-character values; and
  generate the data by combining the generated sub-character values.

21. The computer program product of claim 20, wherein a frequency identified from a frequency block is associated with a maximum magnitude within the frequency block.

22. The computer program product of claim 20, wherein determine the sub-character value associated with the selected identified frequency based on the modified frequency and the frequency difference between sub-character values comprises:
  divide the modified frequency by the frequency difference between sub-character values.

23. A method, in a client device, comprising:
retrieving data from the client device;
partitioning the data into one or more characters;
partitioning each character into a plurality of sub-characters;
determining a base frequency, an increment frequency, and a number of frequency blocks;
encoding each sub-character into a respective frequency associated with a frequency block based on the base frequency, the increment frequency, and the number of frequency blocks, wherein encoding each sub-character into the respective frequency comprises:
  determining a value of the sub-character;
  determining a block number of a frequency block associated with the sub-character, the frequency block including a range of frequencies;
  determining a block frequency value for the frequency block associated with the sub-character based on the respective block number of the frequency block associated with the sub-character and a size associated with the frequency block associated with the sub-character;
  determining a respective sub-character frequency value for the sub-character based on the value of the sub-character and a frequency difference between values associated with sub-characters;
  determining a respective frequency increment for the sub-character based at least in part on the respective block frequency value and the respective sub-character frequency value; and
  encoding the sub-character into a frequency based on the base frequency and the respective frequency increment for the sub-character;
generating an audio signal from the encoded frequencies associated with multiple ones of the sub-characters; and
transmitting the audio signal to an additional client device via a speaker of the client device.

* * * * *